United States Patent [19]

Duchesneau et al.

[11] Patent Number: 5,971,660
[45] Date of Patent: Oct. 26, 1999

[54] EXTENSIBLE BARRIER TO RETAIN A HYDROCARBON SLICK BETWEEN A FIXED AND A FLOATING STRUCTURE

[76] Inventors: Gilles Duchesneau, 2080 des Lucioles, Beauport, Qc, Canada, G1C 6M6; Jean-Pierre Bourque, 359, 12ième Avenue, Pintendre, Qc., Canada, G6C 1K7

[21] Appl. No.: 08/778,090

[22] Filed: Jan. 2, 1997

[30] Foreign Application Priority Data

Jan. 5, 1996 [GB] United Kingdom .................. 9600183

[51] Int. Cl.⁶ ......................................................... E02B 15/04
[52] U.S. Cl. ........................................................... 405/65
[58] Field of Search ....................................... 405/63–72

[56] References Cited

U.S. PATENT DOCUMENTS

| | | | |
|---|---|---|---|
| 2,240,567 | 5/1941 | Meachem et al. | 405/70 |
| 3,766,738 | 10/1973 | Gaush | 61/1 F |
| 3,766,739 | 10/1973 | MacLean | 61/1 F |
| 3,818,708 | 6/1974 | Benson | 405/65 |
| 3,859,796 | 1/1975 | Benson | 405/65 |
| 3,906,732 | 9/1975 | Tedeschi, Jr. | 61/1 F |
| 4,003,206 | 1/1977 | Tanksley | 61/1 F |
| 4,348,136 | 9/1982 | Donovan | 405/65 |

FOREIGN PATENT DOCUMENTS

| | | |
|---|---|---|
| 1178810 | 12/1984 | Canada . |
| 2133022 | 7/1994 | Canada . |
| 148816 | 11/1980 | Japan ....................................... 405/65 |

*Primary Examiner*—David J. Bagnell
*Assistant Examiner*—Frederick L. Lagman

[57] ABSTRACT

This invention bode is to confine potential oil spills while transfer in, between a ship and a wharf, or between two ships. It is made of a barrier that is fitted on a IS beam fixed on the wharf on which the barrier can be moved vertically with a float, according to the waterline. This barrier is mobile and detachable, of a mechanical. pneumatic or hydraulic type, and can be easily operated by one man. A waterproof canvas is placed on the mechanical barrier to confine the oil slick; a spring thrusts a shoe against the hull of the ship and is kept in place by magnets. A mechanical arm slides against the hull, with the help of balls. A hydraulic alternative stops oil diffusion by creating a current. A pneumatic alternative uses a curtain of bubbles that burst at the surface and hold the oil while creating a current.

20 Claims, 9 Drawing Sheets

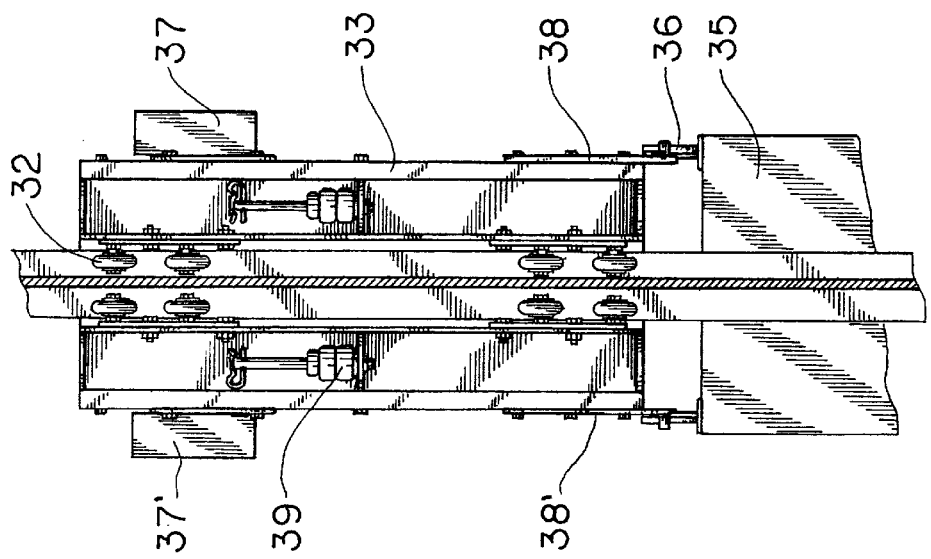
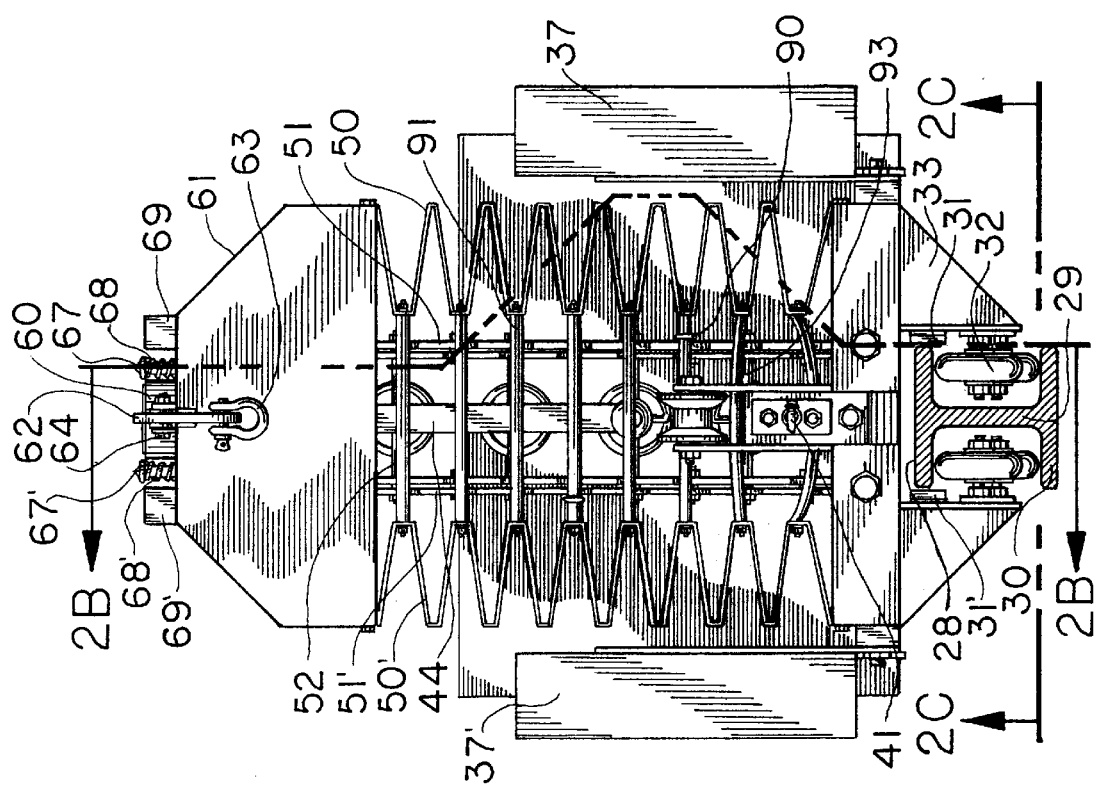

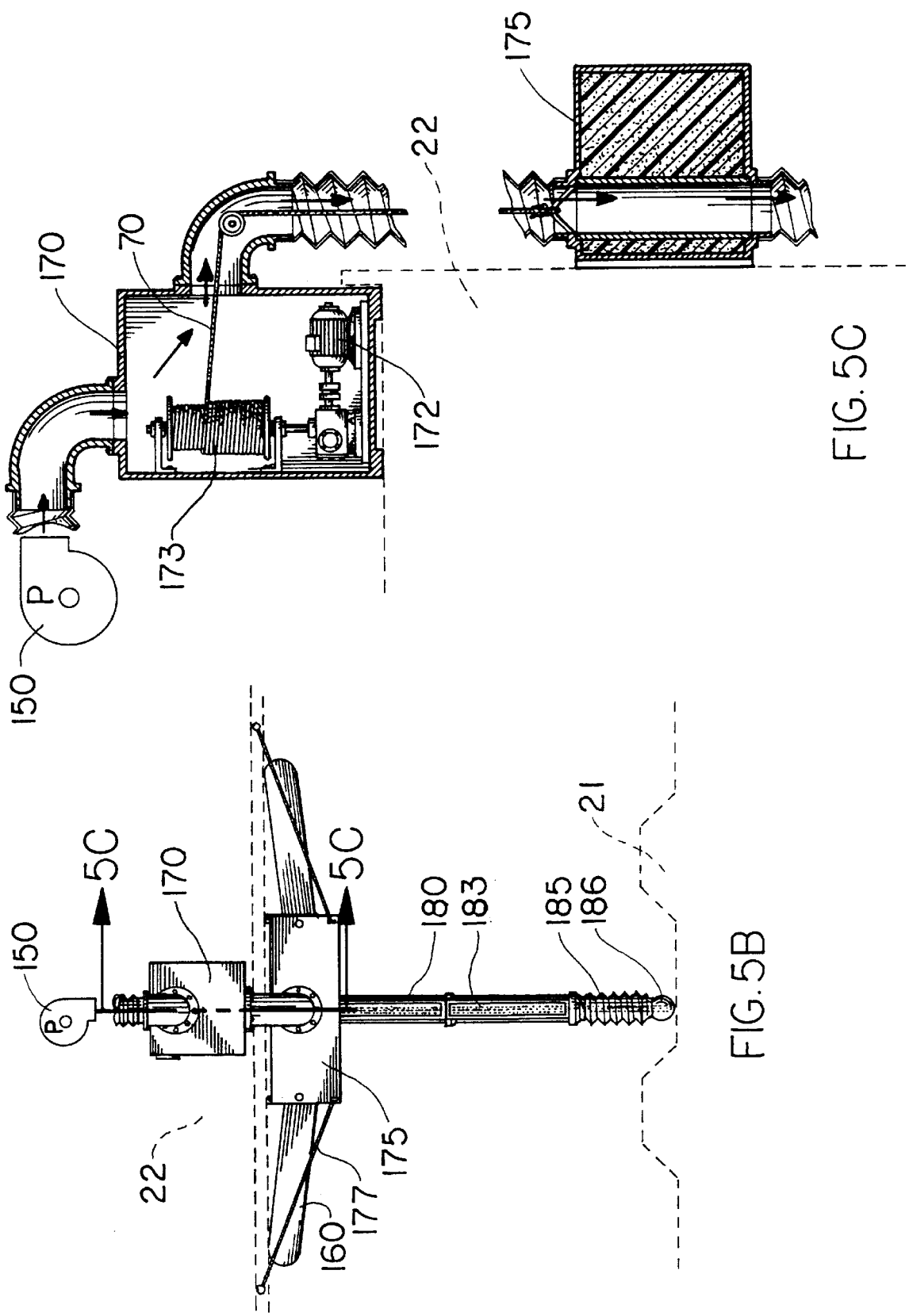

5,971,660

EXTENSIBLE BARRIER TO RETAIN A HYDROCARBON SLICK BETWEEN A FIXED AND A FLOATING STRUCTURE

BACKGROUND-FIELD OF INVENTION

This invention belongs to the family of prevention devices to be used when transferring hydrocarbons between a fixed structure and a floating one or between two floating structures, particularly a hydrocarbon transshipment from a ship.

BACKGROUND-DESCRIPTION OF THE PRIOR ART

Many devices to contain an oil slick during transshipment. Some of these have held our attention:

CA 2,133,022, Jack M. Wilcox, Sep. 24, 1994, shows a containment device allowing only to stop spills. This device does not contain hydrocarbons flowing out between a fixed and a floating structures.

CA 1,178,810, Eriksson, Dec. 4, 1984, illustrates a floating boom with a skirt, ballast and fender on which floats are fixed, to keep the canvas skirt vertical, with a freeboard over waterline, but this device does not allow a quick and easy installation to confine a space where a hydrocarbon spill has occurred. Its hard installation requires several workers and other equipment, such as a boat because the device is heavy and subjected to currents.

U.S. Pat. No. 3,766,739, MacLean, May 30, 1972. This device requires the installation of permanent bumper dolphins 4 so the ship will not go into the cylinder 13. Also this device, with a hydraulic piston, cannot react adequately to the movement of the ship relative to the wharf. If the ship is swayed or moved away by currents, winds, waves or hydrocarbon transfers between the ship and the wharf, the watertightness between the blade 9 and the hull of the ship may decrease. This device may hardly he used in presence of ice or if the space between shin and a wharf varies.

U.S. Pat. No. 3,003,206, Tankley, Jan. 18, 1977. It is a vertical float without wheels, that serves as a connector to attach a floating boom to a wharf.

U.S. Pat. No. 3.766,738, Gaush, Oct. 23, 1973. This device allows angular movements of a floating boom with a clamp 34 and allows vertical movement with buoyant members. Rollers 38 allow frictionless vertical movements, and are placed within a metal pipe 31 surrounded by a resilient wall 39. This device is complex and may only be used for conventional floating boom.

U.S. Pat. No. 3,906,732, Tedeschi Jr, Sep. 23, 1975, illustrates a barrier fixed to a pier 12 and going toward a ship 14. This harrier cannot be used as a prevention device as it does not comprise any element required to form a watertight barrier. The pressure against the ship is created by an extension spring 82 and the float is moved vertically along strand members 70. This device may be useful with a small frontal dock but does not explain how it could be adapted to prevent hydrocarbon leaks.

U.S. Pat. No. 2,240.567, Meacham ct al, May 6 1941, introduces a barrier comprising a waterproof canvas 2 buoyantly supported by floats and maintained vertically by weights 5 disposed on all the length of the canvas. This device requires many workers and installation equipment. It cannot be mobile between a ship and a fixed structure.

OBJECTS AND ADVANTAGES

The main objective of this invention is to provide a security device that can he used when loading and unloading of ships, to contain any possible hydrocarbon spills.

BRIEF DESCRIPTION OF THE DRAWINGS

The present invention will be further understood from the following description with reference to the drawings in which:

FIG. 2A is a top plan view of the anti-pollution barrier of FIG. 1

FIG. 2C is a cross-section according to line C—C of FIG. 2A

FIG. 5B is a top plan view according to line 5B—5B of FIG. 5A

DESCRIPTION OF THE PREFERRED EMBODIMENT

Figure 1:
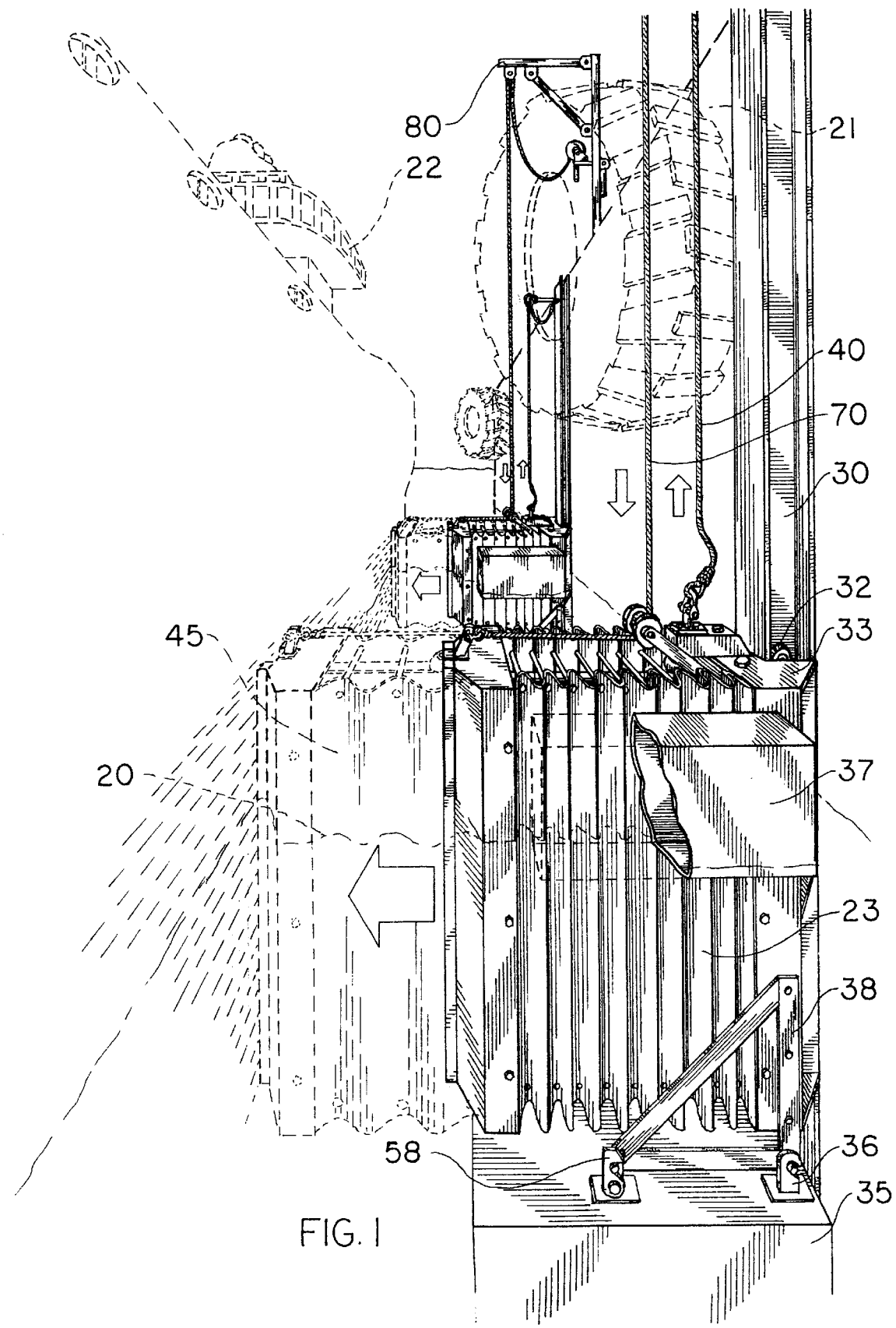
FIG. 1 is a perspective of the barrier with trellis.

The preferred embodiment of the invention is illustrated in FIG. 1 where the same characterizing elements are identified by the same numbers.

FIG. 1 shows a perspective of the utilization of a mechanical barrier 23 with an extensible trellis, illustrated at rest, in a continuous line and in extension in a dotted line. The extended barrier allows the containment of hydrocarbon spills between a fixed structure, as a wharf 21 and a floating one as a ship 22. The barrier is joined to the wharf 21 by a H beam 30. The mechanical barrier 23 may be sled up and down along the H beam 30 with a launching cable 70, according to a water level 20 or the height of the wharf. The launching cable 70 goes up along the wharf 21 and go through a jib 80 so the user can pull the barrier up with a minimal effort. The vertical movement of the barrier on the H beam 30 is provided by rollers 32 placed on each side of a web 29 of the H beam 30 and fixed to a head 33. The adjustment of the rollers 32 is made by means of adjustment plates 27 and 27' fixed on the head 33 of the barrier by two adjustment bolts 25 and 26—FIG. 2B. These two adjustment bolts 25 and 26 allow the control of the friction between the rollers 32 and the H beam 30 and also the horizontal adjustment of the barrier if the H beam 30 is not totally vertical.

FIG. 2A illustrates the seals 31 and 31' placed on each side, a guide on the head 33 is fitted to a bed plate 28 of the H beam 30 to prevent the spread of hydrocarbons through the barrier. When the barrier is set in motion, a shoe 61 is thrust onto the ship 22 and magnets 60 and 60' stick the shoe 61 to the hull of the ship 22. Points 67 placed on the shoe 61 are spring driven 68 and sink into the paint of the hull of the ship 22 and prevent the motion of the shoe 61, vertically or horizontally, relative to the ship 22. When the barrier is set off, waterproof canvasses 50 and 50'spread between the head 33 and the shoe 61 on which they are fixed, to cover the space between the wharf 21 and the ship 22. Between the shoe 61 and the ship 22, the watertightness is ensured by two watertight strips 69 and 69' placed on a contact surface 72 of the shoe 61. The shoe 61 is joined to a pair of extensible trellis by a ball joint arm 57 and fixing, springs 59. The fixing springs 59 and the ball joint arm 57 are fixed on sliding rods 55' placed under a fastening surface 73 of the shoe 61. The ball joint arm 57 and the fixing springs 59 allow the shoe 61 to move in all direction, up to a maximum of 15° of the general axis of the barrier.

The waterproof canvasses 50 are made of a flexible fabric, resistant to heat, cold and hydrocarbons and with lasting quality. The waterproof canvasses 50 are accordion-pleated to absorb the movement caused by the multiple expansions and retractions of the barrier.

These pleats are also ensured by joint rods 52 joining both canvasses at their top and bottom at a fixed distance. Internal springs 56 are linked at the bottom to the meeting points 46 by joining rods 93 and at the top to trellis extension 90, already applying a continuous downward force onto the trellis extension 90 which exerts a continuous tension for the expansion of the trellis 90 and to stay put. On the top of the extensible trellis 51, the vertical position of the canvas 50 is maintained by the trellis extensions 90—FIG. 2B—placed on a meeting point 46 at their bottom and by a canvass joint 91 at their top, preventing the canvasses 50 to touch the extensible trellis 51 when extended or retracted.

Figure 2B:
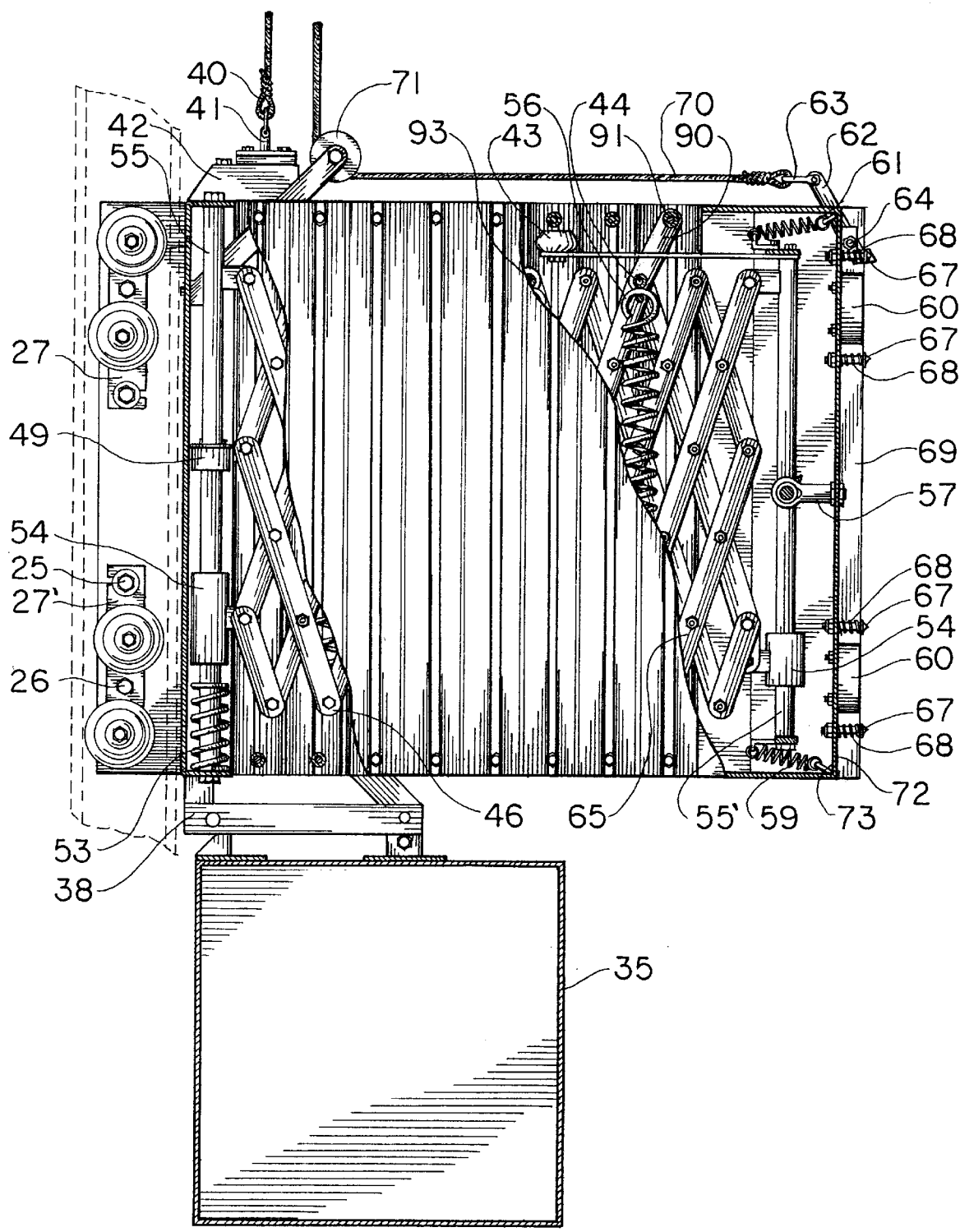
FIG. 2B is a cross-section according to line B—B of FIG. 2A

FIG. 2B shows that when the barrier is set off, the mobile bindings 54 and 54'slide along the sliding rods 55 sprung by the starting impulse springs 53. An extension stopper 49 is fixed on the sliding rods 55 and 55'. Internal springs 56 are attached on various places oil the extensible trellis 51 so the barrier will expand with a constant force. The extensible trellis 51 takes then an extended position thanks to the meeting points 46 that allow the slats 65 of the extensible trellis 51 to move one against the other, even though they be double. Thus the rigidity of the barrier can be increased by adding other extensible trellis 51 to the one already in place.

The waterline of the barrier with a predetermined freeboard 45 is insured by a buoyancy tank floater 35 placed under the barrier and comprising two hooks 36 and an automatic fixing device 58 that clings to a triangular structure 38 fixed on the head 33 of the barrier. To provide a faster reaction against the effect of waves, additional float working as compensators 37 are fixed to the head 33.

A skirt 104 of the barrier is preferably two thirds immersed and a third freeboard 45. To adjust the waterline of the barrier at all times, weight gauge 39—FIG. 2C—may be installed in the head 33 of the barrier.

The barrier is set off by pulling on a release cable 40 on the wharf 21. The release cable 40 pulls on a trigger 41 placed on the head 33 of the barrier. The trigger 41 is thrusted downwards by a restraining spring 42 shown as a spring case in FIG. 2A. When the barrier is retracted, the trigger 41 is in the locking handle 43—FIG .2B—, is subjected to a locking rod 44 that is subjected to the shoe 61 of the barrier. The locking handle 43 is of a round or angular shape so that when the barrier is retracting, the trigger 41 can slide on the locking handle 43 and goes into its center when the barrier is in retracted position. To allow the opening of the enclosure by the retraction of the barrier with a minimum effort, the launching cable 70 goes through a pulley 71 to attach itself on shoe 61 through a pivoted arm 62 at the end of which a fastening hook 63 is fixed. When the user pull on the launching cable is 70, the pivoting arm 62 releases the magnets 60 of the hull of the ship 22 by pivoting on the pivoted bolt 64 serving as axis of rotation.

Figure 3:
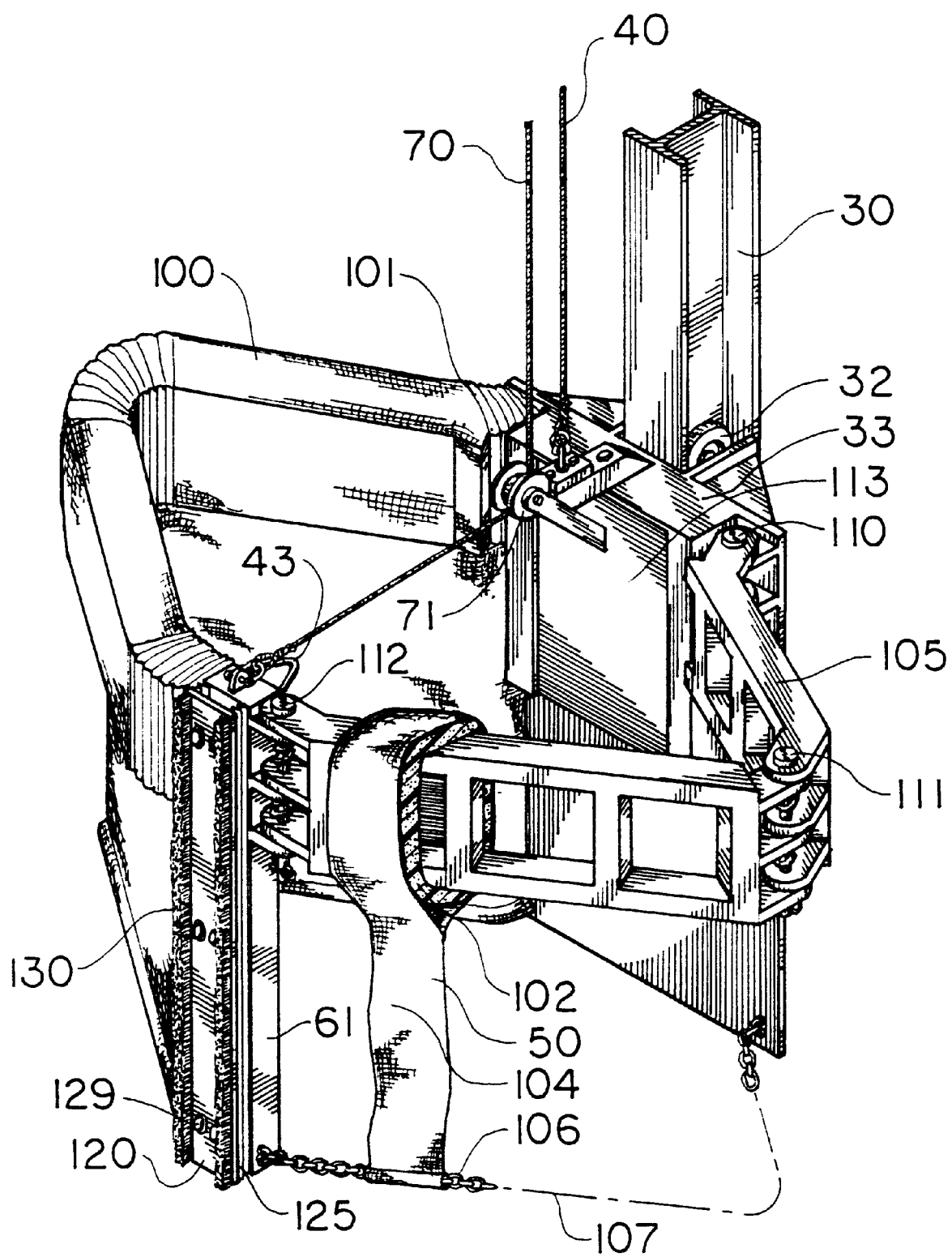
FIG. 3 is a perspective of an embodiment with an arm.
Figure 4A:
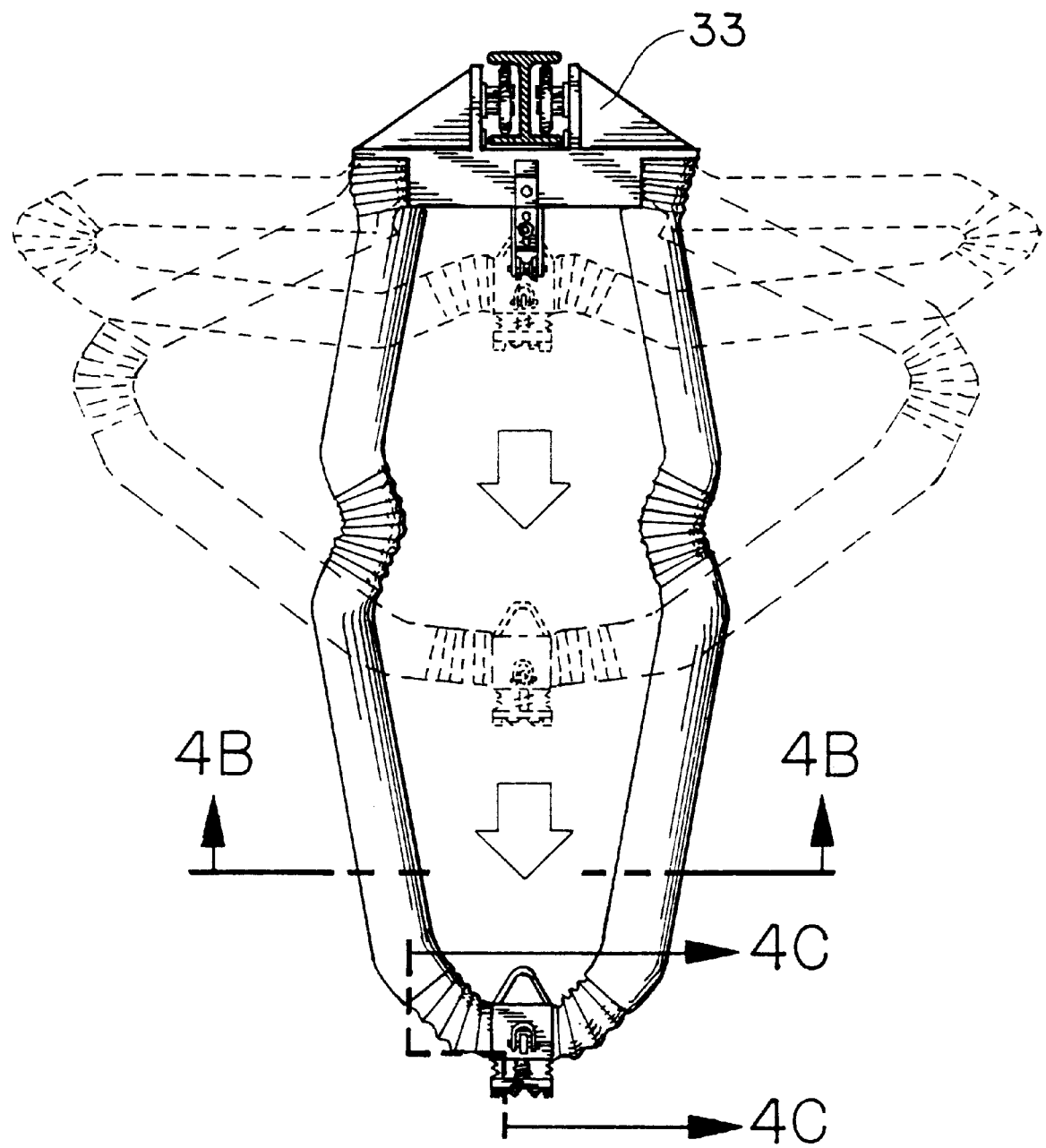
FIG. 4A is a top plan view of the embodiment of FIG. 3
Figure 4C:
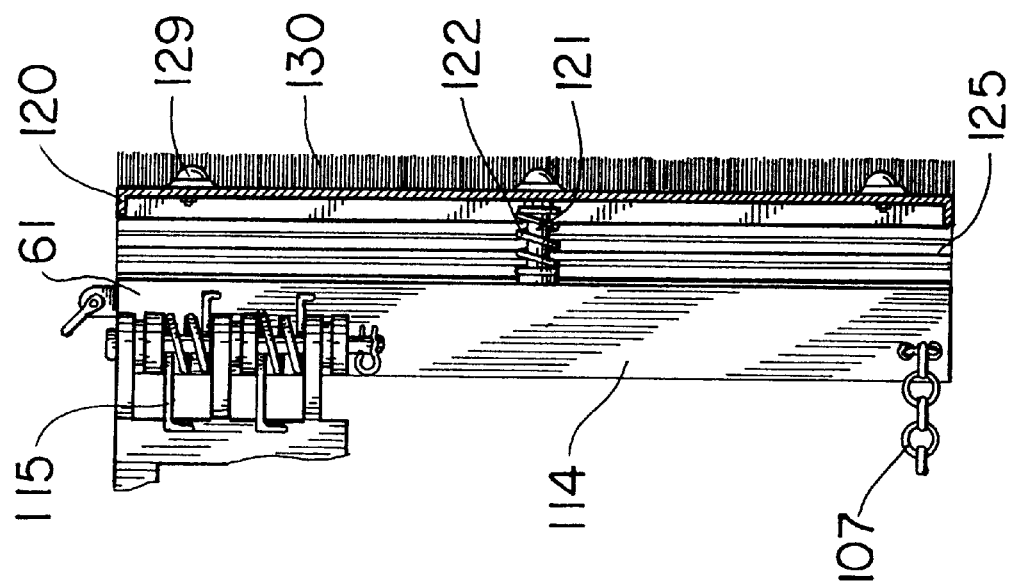
FIG. 4C is a cross-section according to line 4C—4C of FIG. 4A
Figure 4B:
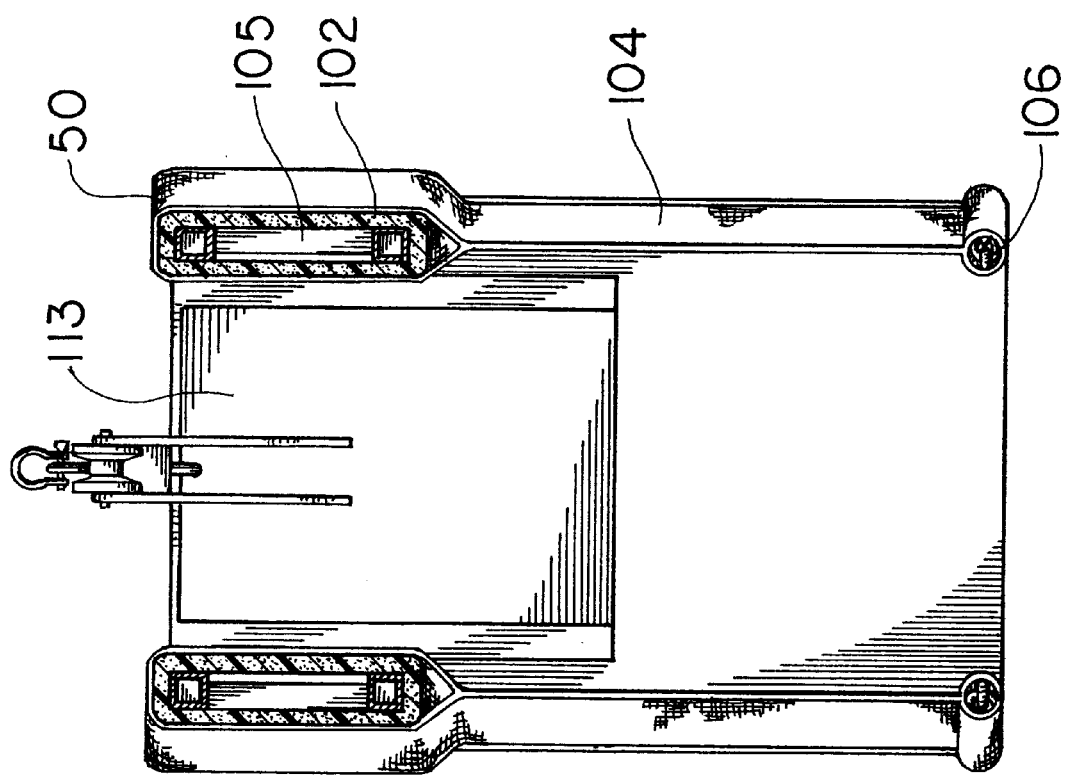
FIG. 4B is a cross-section according to line 4B—4B of FIG. 4A

FIG. 3 shows the barrier with folding arms 101. This embodiment works in the same condition as the mechanical barrier. It has the same capacities to move vertically according to tides and to adjust itself to various distances between the two structures. Instead of extensible trellis 51 to link the head 33 to the shoe 61, this barrier has jointed arms 100. These jointed arms 100 are made of two ladder-shaped beams 105 surrounded with a buoyancy ring 102, around which is a waterproof canvas 50. A ballast 106, in this case a chain 107, is placed on the bottom of the waterproof canvas 50 to force a skirt 104 of the waterproof canvas 50 to go down vertically in the water. The jointed arms 100 are joined to the head 33 by an arm joint 110, joined together on each side by a central joint 111, and joined to the shoe by a shoe joint 112. The buoyancy of the barrier with folding arms 101 is ensured by a buoyancy ring 102, a head float 113, made of polystyrene or other waterproof material, as an integral part of the head 33 of the barrier, and a shoe float 114, similar to the head float 113, fixed to the shoe. FIG. 4C illustrates rotation springs 115 inserted in all the joints 110, 111 and 112 to force the extension of the barrier.

One difference between the mechanical barrier and the barrier with folding arms 101 is the shoe 61. In the barrier with folding arms 101, the rear of the shoe 120 comes into contact with the ship 22 and is fixed on the shoe 61 with a ball joint bolt 121 around which is a rigid spring 122 forcing the rear of the shoe 120 to form a perpendicular plane with the axis of the ball joint bolt 121 when released. A shoe canvas 125 is placed between the shoe 61 and the rear of the shoe 120, to ensure watertightness. It is made of the same type of fabric as the waterproof canvasses 50 and is pleated to allow the motion of the rear of the shoe 120. The rear of the shoe 120 slides on the hull of the ship 22, contrarily to the shoe 61 of the barrier with extensible trellis. The contact of the rear of the shoe 120 with the ship 22 is ensured by the force of the extension springs inserted in the joints 110, 111 and 112. The sliding of the rear of the shoe 120 is made frictionless by spherical bearings 129. The watertightness between the rear of the shoe 120 and the ship 22 is ensured by brushes 130 placed on both sides of the rear of the shoe 120.

Figure 5A:
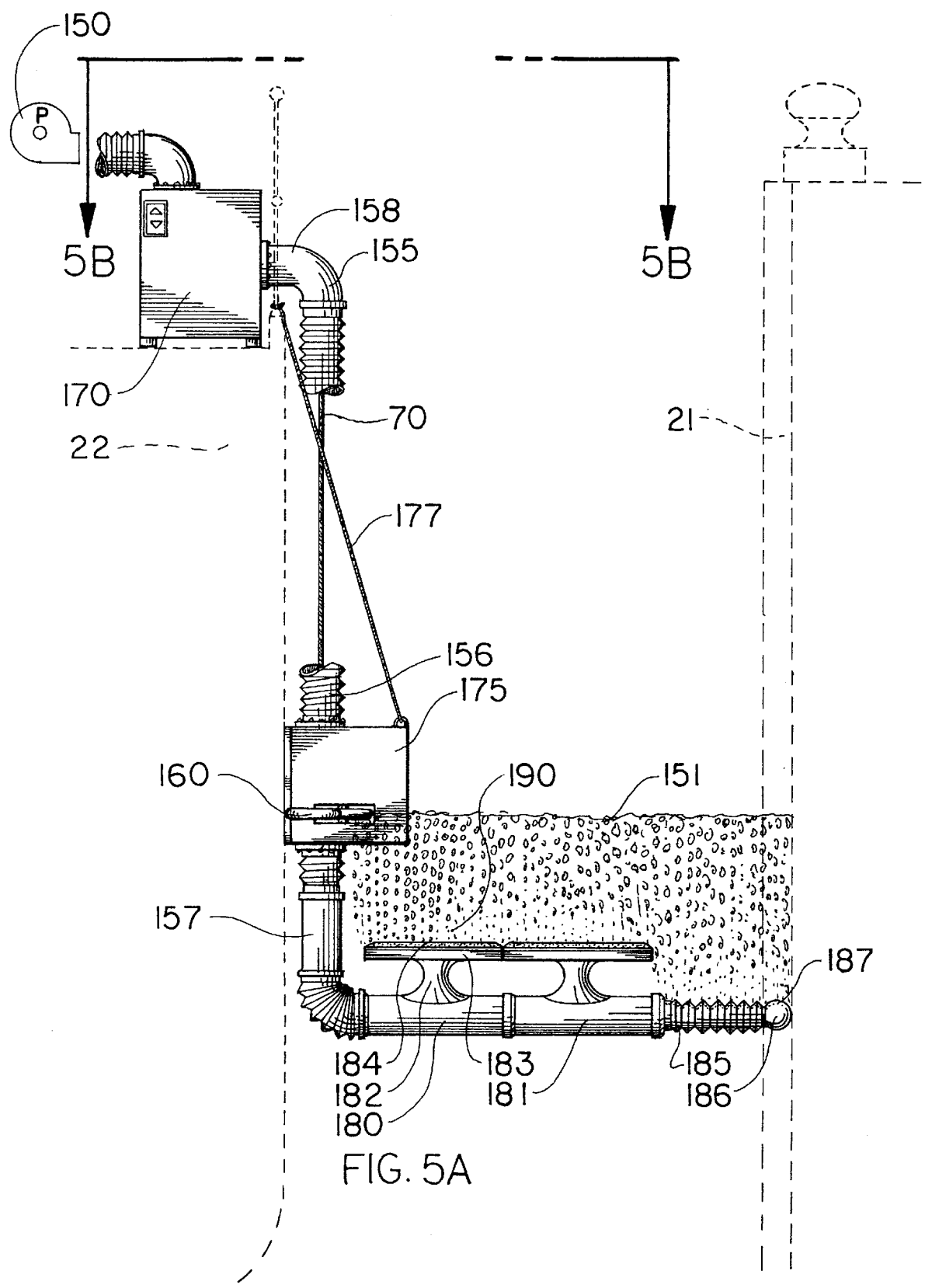
FIG. 5A is a side view of a pneumatic embodiment.

FIG. 5A shows a self-adjustable pneumatic floating barrier 151. This barrier comprises an air pump 150 blowing air, into a pneumatic feed duct 155. The air pump 150 is installed on the ship 22. The pneumatic feed duct 155 has a set of pleated pipes 156, straight rigid pipes 157 and elbows 158. All these pneumatic feed ducts 155 provide air to the rest of the barrier at various water levels. The barrier can be lifted on the ship 22 with a launching cable 70 passing through the pneumatic feed duct 155, thus keeping the pneumatic feed duct 155 strait. The launching cable 70 is attached to the boat inside a weighing and junction box 170 on which is connected the pneumatic feed duct 155. The weighing and junction box 170, with a winch motor 172 and a winch roller 173—FIG—, can adjust automatically the tension of the launching cable 70 according to the level of water, automatically taking the slack off the launching cable and the pneumatic feed duct 155; the rest of the barrier moves with the water level. At the water surface is a float and surface joint box 175 on which are installed floating keels 160—FIG. 5B. The float and surface joint box 175 serves as float for the barrier while the keel 160 stabilizes the barrier against the motion of water like waves and keep it the axis of the ship. Two positioning cables 177 are attached to the float and surface joint box 175 and also at a certain horizontal distance on the deck of the ship 22 to prevent the drift of the barrier towards the bow or the stern of the ship 22. Twin sections 180 are installed horizontally, at a predetermined distance of the surface, and in a sufficient number to cover the distance between the ship 22 and the wharf 21, the distance covered by an extensible section 185 added to the end of a twin section 180. The twin sections comprise a branch pipe 181, a compression joint and zone 182 of a shape similar to the. One of a diffusion chamber 183 covered with a microporous membrane 184 through which the air is evacuated in the form of microbubbles 190. The branch pipe 181; the compression joint and zone 182 and the diffusion chamber 183 form the compression chamber wherein the air pressure increases gradually. Along the extensible section 185, close to the water surface, microbubbles escape through tiny holes 187. The extensible section covers the distance between the end of the last twin section and the wharf 21 by an extension of the extensible section 185 under the air pressure.

Figure 6:
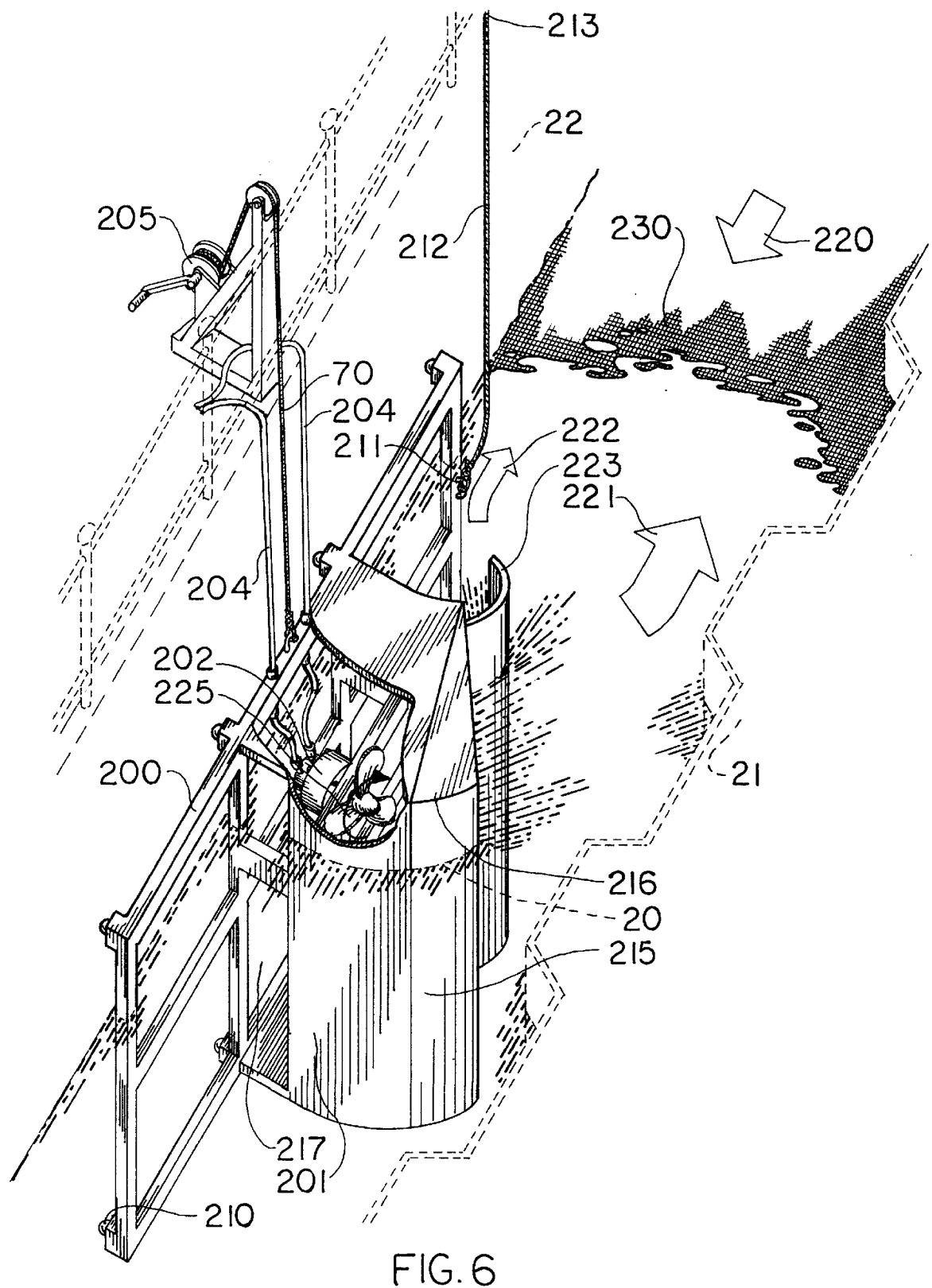
FIG. 6 is a perspective of a hydraulic embodiment.

FIG.6 shows a hydraulic barrier 201 using the inability of hydrocarbons to move through currents. A mobile floating support 200 is lowered from the ship 22 or the warf 21 into water by means of a launching cable 70 and manual or motorized weighing means.

A hydraulic or electric motor 202 is installed on the ship 22 and a feed duct 204 goes down along the hull beside the launching cable 70. The mobile floating support 200 is provided with roller bearings 210, at the top and bottom of the mobile floating support 200 on the side facing the ship 22. A mooring cable 212 comprises an inferior end 211, attached to the mobile floating support 200 close to the water surface, and a superior end 213 attached to the ship, at a horizontal distance in the direction of a forced water current ejected by a main water output 221 and controlled by a guiding box 215 joined to the mobile floating support 200 and that can move against the natural current 220.

At a predetermined distance in the guiding box 215 is installed a set of propellers 225, along a vertical axis passing through the horizontal center of the guiding box 215. A propeller 225 utilizes the power brought by the hydraulic or electric feed duct 204. The propeller projects water coming through the water input 217 to create a forced current at a predetermined angle, according to the conditions. between the wharf 21 and the ship 22. This angle may vary from 0 to 90 degrees to allow the creation and maintenance of an enclosure to confine the hydrocarbons. An angle α is induced by the variable deflection curve 216 formed by the guiding box 215. Most of the water projected by the propellers 225 is rejected at the main water output 221 but a small amount is projected along the guiding box 215. This water goes through the secondary water output 222 and its angle is induced through the guiding box 215. The hydrocarbon slick 230 is kept at a reasonable distance from the guiding box 215 by the current created by the propeller 225.

SUMMARY AND DIRECTIONS FOR USE

One man should be able to set off this device quickly. The device should adapt to variations of level of water and ship caused by tides and variation of the weight of a ship when loading or unloading. It should also adapt to the variations of the angle of the hull of the ship caused by rolling, itself caused by motion of water and hydrocarbon transfer from one structure to the other. This device also allows the ship to move slightly parallel to the wharf, without reducing water-tightness.

More specific objectives of this device are to allow vertical movements according to tides by means of the lifting of the head of the device along a H beam fixed to the wharf, the rest of the device being free to move vertically along the beam by rolling means. The control of the vertical movement of this part of the device is ensured by light and waterproof materials acting as a floating, device, to follow the motion of water.

The part of the system that is farthest from the wharf is a U-shaped piece. The U-shaped piece permits the barrier to extend from the wharf to the ship and comprises magnets fixed within, to maintain the contact between the barrier and the ship. Like the part fixed on the wharf, this part is provided with a floating system.

The part of the system that permits the canvssses to extend is preferably a kind of trellis of which all the meeting, points between two slats are pivoted to allow the rotation of one against the other.

There are two of those trellis, parallel and placed at both ends on mobile bindings. These mobile bindings can move vertically along sliding rods 55 fixed on the head and the shoe 61.

SUMMARY

A device used to confine hydrocarbons in an enclosure at the time of transshipment between a fixed structure and a floating structure, this device comprising:

extensible barrier means that can be extended from a retracted position to an extended position to cover the space between the fixed structure and the floating one, the barrier means comprising a head, an extensible central body and a shoe to contact the floating structure, the central body may be partially immersed, sliding means fixed on the fixed structure to allow the vertical movement of the head from a dry level to a partially immersed level and vice-versa, means for maintaining the barrier in contact, in place and extended, means to return to the retracted position.

The barrier, while in retracted position, may be manipulated by the head, lowered along the fixed structure to be partially immersed, and then extended until a protecting shoe seals the area up to the floating structure, the central body being partially immersed, between the fixed structure and the floating structure, so the barrier may confine the hydrocarbons to one side of the barrier.

IN OPERATION

The mechanical unit with a unidirectional extension is portable. The first step is to bring it to the wharf and attach it in its center by a cable attached to a winch. Then the float is installed under the unit. The device is rolled down along a H beam already in place, on the side of the wharf. The device is in the water and floats.

A buoyancy compensator may then be used to thwart the effect of waves. The freeboard should be at least a third of the height of the mechanical apparatus.

The shutter release is then pulled and the barrier is sprung forward till the shoe comes into contact with the ship and secured in place by means of a magnet.

To release the shoe, one has only to pull on the releasing means of the magnet, then the barrier can be retracted and pulled out of the water.

Directions for the installation of the barrier with folding arm

1—Lower retracted barrier down to water level.

2—Set the arm off from a position 90° with the perpendicular line of the wharf until the arm comes into contact with the hull of the ship, thus creating a barrier.

3—Bring the barrier back by means of a winch mechanism.

Directions for the installation of the pneumatic barrier with bubbles:

1—Anticipate the extension length to cover the distance from the ship and lower the bubble apparatus down to a predetermined level under water.

2—Activate the system that produces bubbles to create a hydrocarbon tight curtain. A signal section 185 moves forward to cover the distance from there to the wharf to seal the enclosure.

3—Bring the barrier back by means of a winch mechanism.

Directions for the installation of the hydraulic barrier:

1—Lower the head down to a buoyancy level, propeller immersed.

2—Activate power supply. The propeller creates a current which is directed at an angle. The value of the angle is adjustable according to a table defining a relationship "distance vs. the angle", such that the current will create a barrier at each end of the enclosure. Adjust the revolution of the propellers to create the barrier.

3—Bring the barrier back with a winch mechanism.

While the present invention has been shown in the drawings and fully described above, with particularity and detail in connection with what is presently deemed to be the most practical and preferred embodiments of the invention, it will apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

For example for the unit to be explosion proof, use stainless steel for anti sparking properties in all parts which are to be in contact with air and/or water.

PARTS LIST

| 20 | water level | 52 | joint rods |
|---|---|---|---|
| 21 | wharf | 53 | starting impulse spring |
| 22 | ship | 54 | mobile biding |
| 23 | mechanical barrier | 55 | sliding rod |
| 25 | adjustment bolt | 56 | internal spring |
| 26 | adjustment bolt | 57 | ball joint arm |
| 27 | adjustment plates | 58 | automatic fixing device |
| 28 | Bed plate | 59 | fixing spring |
| 29 | web | 60 | magnet |
| 30 | H beam | 61 | shoe |
| 31 | seal | 62 | pivoted arm |
| 32 | roller | 63 | fastening hook |
| 33 | head | 64 | pivoted bolt |
| 35 | floater | 65 | slat |
| 36 | hook | 67 | points |
| 37 | compensating float | 68 | spring of points |
| 38 | triangular structure | 69 | watertight strips |
| 39 | weight gauge | 70 | launching cable |
| 40 | release cable | 71 | pulley |
| 41 | trigger | 72 | contact surface |
| 42 | restraining spring box | 73 | fastening surface |
| 43 | Locking handle | 80 | jib |
| 44 | locking rod | 90 | trellis extension |
| 45 | freeboard | 91 | canvas joint |
| 46 | meeting points | 93 | joining rod |
| 49 | extension stopper | 100 | jointed arm |
| 50 | waterproof canvas | 101 | barrier with folding arms |
| 51 | extensible trellis | 102 | buoyancy ring |
| 104 | skirt | 181 | branch pipe |
| 105 | ladder-shaped beam | 182 | compression joint & zone |
| 106 | ballast | 183 | diffusion chamber |
| 107 | chain | 184 | microporous membrane |
| 110 | arm joint | 185 | extensible section |
| 111 | central joint | 186 | round head |
| 112 | shoe joint | 187 | tiny holes |
| 113 | head float | 190 | microbubbles |

-continued

PARTS LIST

| 114 | shoe float | 200 | mobile floating support |
|---|---|---|---|
| 115 | sotation spring | 201 | hydraulic barrier |
| 120 | rear of the shoe | 202 | hydraulic or electric motor |
| 121 | ball joint bolt | 204 | hydraulic feed duct |
| 122 | rigid spring | 205 | weighing system |
| 125 | shoe canvas | 210 | roller bearing |
| 129 | spherical bearings | 211 | inferior end |
| 130 | srush | 212 | mooring cable |
| 150 | air pump | 213 | superior end |
| 151 | pneumatic barrier | 215 | guiding box |
| 155 | pneumatic feed duct | 216 | curve |
| 156 | pleated pipe | 217 | water input |
| 157 | straight rigid pipes | 220 | current |
| 158 | elbow | 221 | main water output |
| 160 | buoyant keel | 222 | secondary water output |
| 170 | weighing and junction box | 223 | guiding arch |
| 172 | winch motor | 225 | propeller |
| 173 | winch roller | 230 | oil slick |
| 175 | float and surface joint box | | |
| 177 | positioning cable | | |
| 180 | twin section | | |

What is claimed as being new and desires to be protected by letters patent of the United States is as follows:

1. A device to confine hydrocarbons during transshipment between a first fixed structure partially immersed having a top above water and a second floating structure also partially immersed, defining an elongated space at water level to receive hydrocarbons and forming an enclosure, said device comprising in combination:

a pair of extensible barriers, one extensible barrier comprising a head an extensible central body and a shoe, to contact said floating structure and said extensible barrier being extensible from a retracted position to an extended position, to cover a distance between said fixed structure and said floating structure, said two structures and two of said barriers defining an elongated rectangle, means for sliding said head on said first structure, to allow the vertical movement of said head, when said extensible barrier is in a retracted position, down to a partially immersed level or up towards said top of said first structure, said barrier comprising means to hold said head out of the water and to lower it down along said first structure, to a partially immersed position, means to maintain said extended central body, said show and said head in a partially immersed condition, when said, central body is in an extended position between said first structure and said floating structure, means to put back said barrier into said retracted position, means to set off said extensible body into extension and means for said show to seal against said floating structure, thus making said barrier oiltight, so said hydrocarbons can be confined to one side of said barrier.

2. The device of claim 1 wherein said sliding means comprise a vertical guide on said first structure to allow said device to slide up and down according to water level.

3. The device of claim 2 wherein said vertical guide comprises a H beam fixed on said first structure and said head comprises rollers to allow movement of said head along said H beam, said rollers comprising seals (31) that are in contact with a bed plate of said H beam.

4. The device of claim 2 where in said barrier is a mechanical barrier in which said oiltight means comprise an extensible trellis to which is attached a skirt which is partially immersed when in said extended position, said skirt being made of an oilproof canvas disposed vertically, the top of said skirt being out of the water and the bottom being immersed.

5. The device of claim 4 wherein said oilproof canvas comprises pleated joint rods at said top of skirt and said bottom of skirt.

6. The device of claim 4 wherein said oiltight means comprise means for buoyancy comprising:
a buoyancy tank placed under said head of said barrier, compensating floats placed on both sides of said head and placed at a freeboard of said extensible trellis.

7. The device of claim 4 wherein said extensible trellis comprises crosses with pivots and top joints, said top joints joining a corresponding base by means of a spring adapted to induce extension of said extensible trellis.

8. The device of claim 6 wherein said surface contact of said shoe comprises magnets to temporarily join with said floating structure and a ball joint arm (57) with lever, also attached to said extensible trellis and a rope attached to said lever to withdraw said magnet from said second structure, when said extensible trellis is in extension.

9. The device of claim 8 wherein said magnets comprise peripherical darts placed on said contact surface of said shoe and oiltight strips (69) or oiltight brush (130) positioned vertically on said contact surface of said shoe, on both sides of said magnets.

10. The device of claim 8 comprising a jointed arm (100) with springs (115) to articulate said arm to press said contact surface of said shoe against said second structure.

11. The device of claim 10 wherein said skirt (104) is partially immersed and comprises and oiltight canvas comprising a ballast chain and wrapped around said joined arm (100).

12. The device of claim 11 wherein said oiltight means comprise:
a buoyancy ring (102) between said jointed arm (100) and said oiltight canvasses,
a head float (113) placed on said head of said barrier,
a shoe float (114) placed on said shoe of said barrier.

13. The device of claim 8 wherein said shoe comprises:
a main body joined to said ball joint arm (57),
a plate (120) containing a brush (130) to contact with said second structure,
a ball joint bolt (121) joining said main body to said shoe,
a shoe canvas (125) joining said main body to said shoe and said rear plate (120) shoe.

14. The device of claim 13 wherein said rear of said shoe comprises brushes (130) fixed on said contact surface, said brushes to make the contact between said shoe and said second structure oiltight.

15. The device of claim 13 wherein said oiltight means comprise a pneumatic barrier with microbubbles comprising pipes perforated to create a curtain of said microbubbles through a turbulence zone at the surface of water, blocking the passage of said hydrocarbons and covering said certain distance.

16. The device of claim 15 wherein said vertical guide comprises a launching cable (70) attached to said first structure, said head having a float and a surface joint box (175) on which said launching cable is attached, said head further comprising stabilizer keels (160).

17. The device of claim 15 wherein said pipes comprise twin sections (180) that can be butt joined and an extensible section (185) that covers said distance to said second structure, said extensible section comprising a pleated pipe that expands when an air pressure is applied, said head further comprising means for supplying air.

18. The device of claim 17 wherein, said extensible section comprises a round head (186) at the end opposed to said twin section and serving to get around obstacles, said twin sections comprising diffusion chambers, said extensible section further comprising tiny holes on all its length.

19. The device of claim 13 wherein said oiltight means comprise a hydraulic barrier with propellers and wherein said head comprises at least one propeller to create a current between said structures, said shoe comprising a component of said current making contact for sealing said second structure.

20. The device of claim 19 wherein said propeller comprises a guiding box to direct said current, and said head comprises a mobile floating support (200) on which is fixed said propeller and said guiding box, said mobile floating support (200) being placed on means for sliding to lower said support into a partially immersed position.

* * * * *